United States Patent Office 3,206,683
Patented Sept. 14, 1965

3,206,683
SIGNAL SEQUENCE SENSING APPARATUS
Marvin A. Davis, Clarence, and Donald A. Poepsel, Depew, N.Y., assignors to Westinghouse Electric Corporation, East Pittsburgh, Pa., a corporation of Pennsylvania
Filed Feb. 10, 1961, Ser. No. 88,540
5 Claims. (Cl. 328—97)

The present invention relates in general to signal sequence sensing apparatus, and more particularly to signal sequence sensing or detecting apparatus operative with two or more applied input signals in accordance with the positional movement of some machine member for providing at least one output signal to indicate the direction of the positional movement of said machine member.

It is presently known in this particular art to provide a pulse supplying transducer device coupled to a movable machine member for the purpose of supplying a plurality of pulse signals that are respectively phase displaced in accordance with the direction of the movement of that machine member. For example, two such pulse signals may be supplied, and it is necessary to sense the sequence relationship of those pulse signals to determine for control purposes the direction of movement of the machine member such that a servo system arrangement of the control apparatus can be operative to actually position that machine member in accordance with a predetermined desired position.

Accordingly, it is an object of the present invention to provide an improved signal sequence sensing apparatus that is better operative to provide an indication of the direction of the positional movement of some machine member.

It is a different object of the present invention to provide an improved machine member movement sensing apparatus operative with a plurality of applied input control signals that are supplied as a function of that movement for providing a first indication when said machine member moves in one direction and for providing a different indication when said machine member is moved in another direction.

It is an additional object of the present invention to provide an improved and more versatile machine member moving sensing and indicating apparatus wherein the manner of application of the plurality of input signals is effective to provide a first output signal when the machine member moves in a first direction and to provide a second output signal when that machine member moves in a second and different direction.

Further objects of the present invention will become apparent from the following description taken in conjunction with the accompanying drawings wherein.

Figure 1:
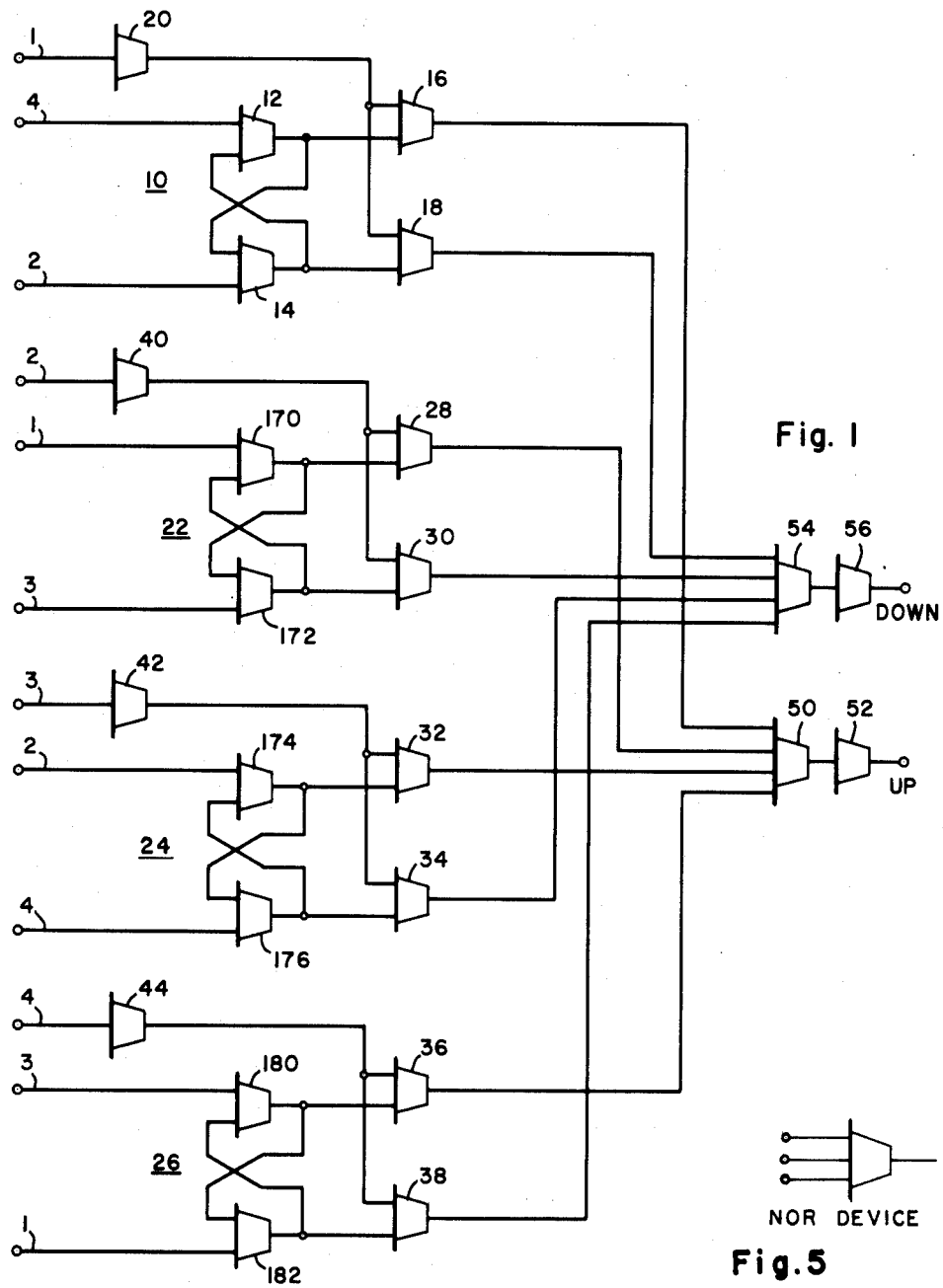
FIGURE 1 is a schematic showing of one embodiment of the present signal sequence sensing apparatus.

In FIG. 1 there is shown the signal sequence sensing apparatus in accordance with the teachings of the present invention, wherein a first memory circuit 10 including NOR device 12 and NOR device 14 is provided for receiving two of the pulse signals 2 and 4 supplied by the sequential pulse generator as will be later explained. The output signal from the NOR device 12 is supplied to a NOR gate device 16 and the output signal from the NOR gate device 16 and the output signal from the NOR device 14 is supplied to a NOR gate device 18, which latter devices 16 and 18 are operative as signal gate circuits. An additional NOR gate device 20 is operative with a third pulse signal 1 supplied by the sequential pulse generator as will be later explained.

In the signal sensing apparatus as shown in FIG. 1, there are provided four similar memory circuits namely the memory circuit 10 already described, a memory circuit 22, a memory circuit 24 and a memory circuit 26. For each of these memory circuits there are provided two NOR devices operative as signal gates such as the NOR gate devices 16 and 18 already described relative to the NOR memory circuit 10. In this regard, the NOR memory circuit 22 is provided with a NOR gate device 28 and a NOR gate device 30. The memory circuit 24 is provided with a NOR gate device 32 and a NOR gate device 34. Similarly, the memory circuit 26 is provided with a NOR gate device 36 and a NOR gate device 38.

Operative with the NOR gate devices 28 and 30 is a NOR gate device 40 which senses a different pulse signal 2 than the two pulse signals 1 and 3 sensed by the NOR memory circuit 22. The NOR gate device 42 is operative with the NOR gate devices 32 and 34, and a NOR gate circuit 44 is operative with the NOR gate devices 36 and 38. The output signals from the NOR gate devices 16, 28, 32 and 36 are supplied to a NOR device 50 operative as an AND circuit. The output of the NOR device 50 is supplied through a NOR device 52 to the UP input of a reversible counter as will be later described. The output signal from the NOR gate devices 18, 30, 34 and 38 are supplied to a NOR device 54 operative as an AND circuit, which in turn provides an output signal through a NOR device 56 to the DOWN count input of the reversible counter as will be later described.

Figure 2:
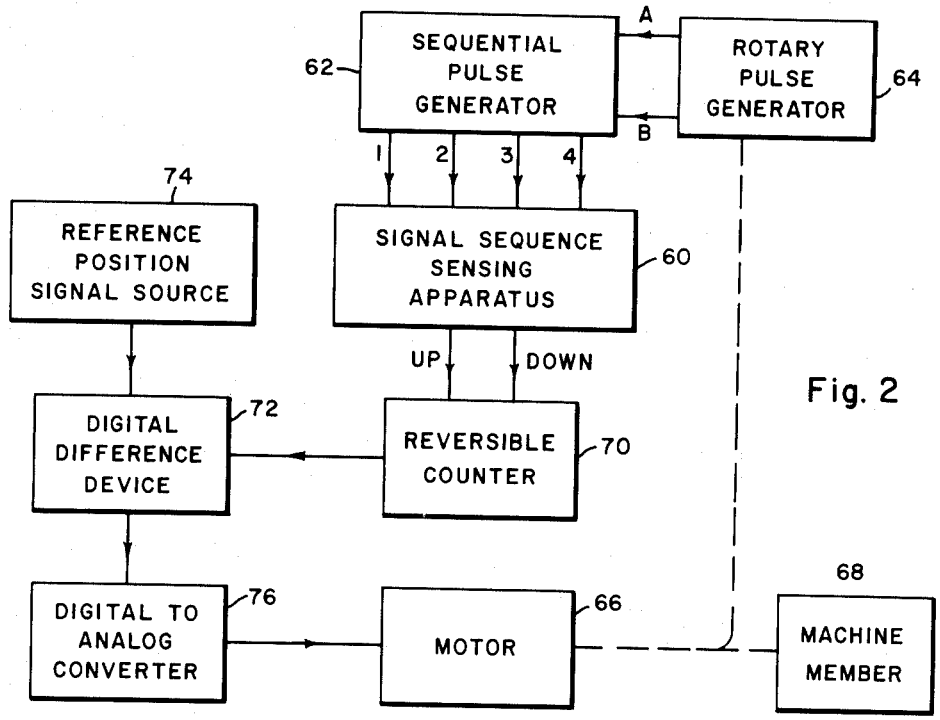
FIG. 2 is a diagrammatic showing of the position control apparatus including the present signal sequence sensing apparatus.

In the diagrammatic showing of FIG. 2, the signal sequence sensing apparatus 60 corresponds to the signal sensing apparatus shown in FIG. 1. There is supplied to the signal sensing apparatus 60 four pulse signals, designated as 1, 2, 3 and 4 in FIG. 2, by a sequential pulse generator 62, which in turn is operative with two control signals (A) and (B) supplied by a rotary pulse generator 64 mechanically coupled to a motor 66 which in turn controls the position of a machine member 68. The signal sequence sensing apparatus is operative to energize either the UP input or the DOWN input of the reversible counter 70, such that the resulting net signal count level of the reversible counter 70 is supplied as an actual position signal to one input of the digital difference device 72. The other input of the digital difference device is supplied by a reference position signal source 74 in accordance with a predetermined and desired reference position for the machine member 68, such that the output of the digital difference device 72 is in the form of a position error signal corresponding to the position error of the machine member 68 relative to the reference position provided by the reference position signal source 74. This position error signal is supplied to a digital to analog converter 76 where it is changed into an analog signal for controlling the operation of motor 66 and thereby positioning the machine member 68 in accordance with the reference position signal supplied by the reference position signal source 74.

Figure 3:
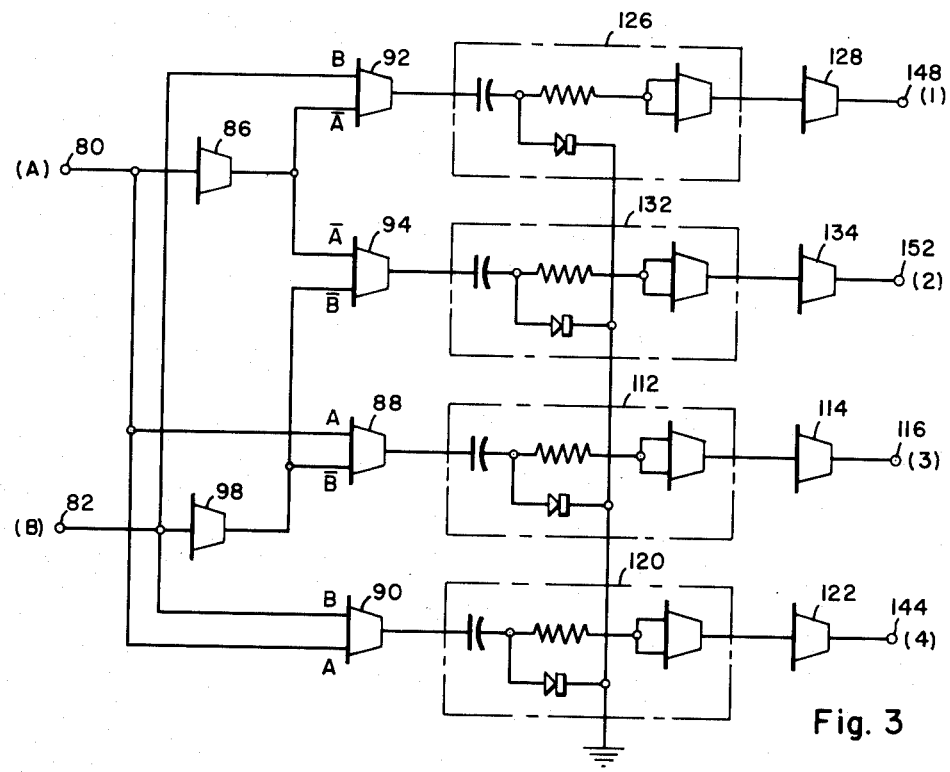
FIG. 3 is a schematic showing of the sequential pulse generator shown in FIG. 2; and, FIG. 4 is a curve chart illustrating the operation of the signal sequence sensing apparatus as shown in FIG. 1, and, FIG. 5 shows a well known NOR device.
Figure 4:
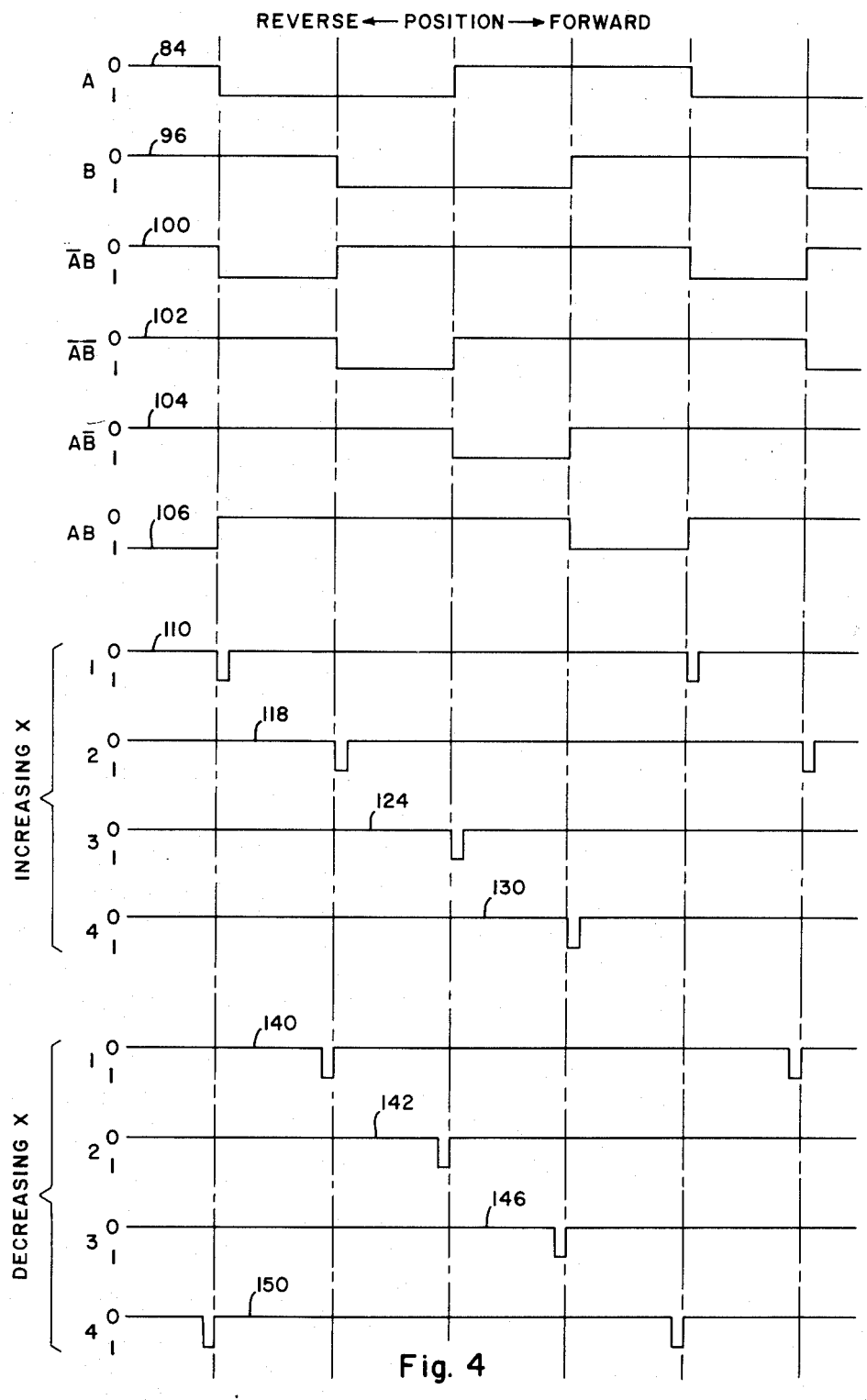

In FIG. 3 there is provided a schematic showing of the sequential pulse generator 62 shown in FIG. 2. A first control signal A is supplied to an input terminal 80. A second control signal B is supplied to an input terminal 82. The control signal A, as shown in curve 84 of FIG. 4, is supplied from the terminal 80 to the NOR device 86 and supplied to one input of each of the NOR devices 88 and 90. The output signal from the NOR device 86 which corresponds to the complement signal $\bar{A}$ is supplied to the NOR devices 92 and 94. The B control signal, as shown in curve 96 of FIG. 4, is supplied through the input terminal 82 to the NOR device 98 and to one input of each of the NOR devices 90 and 92 as shown in FIG. 3. The output of the NOR device 98 corresponds to the complement signal B̄ and is supplied to one input of the NOR devices 88 and 94.

Thusly, the NOR device 88 provides an output signal in accordance with the curve 104 shown in FIG. 4 in accordance with the control signal A and the complement B̄ of the control signal B. The NOR device 90 supplies the control signal 104 shown in FIG. 4 in accordance with the control signal A and the control signal B. The NOR device 92 supplies the control signal 100 shown in FIG. 4 and in accordance with the complement Ā of the A signal and the control signal B. The NOR device 94 supplies the control signal 102 as shown in FIG. 4 and corresponding to the complement Ā of the A signal and the complement B̄ of the B signal.

The pulse signal 1 as shown by curve 110 in FIG. 4 is provided by the pulse shaping circuit 126 and the inverter operating NOR device 128 to the terminal 148, each time that the control signal shown by the curve 100 changes from a ZERO to a ONE value (which ONE signal by definition is a negative voltage signal). Similarly, the pulse signal 2 shown in curve 118 is provided at terminal 152 due to the operation of the pulse shaping circuit 132 and the inverter operating NOR device 134 in response to the control signal shown by waveform 102. Similarly, the pulse signal 3 shown in curve 124 is provided at terminal 116 by the pulse shaping circuit 112 and the inverting NOR device 114 operative with the control signal shown in curve 104 from the NOR device 88. Similarly, the pulse signal 4 shown in curve 130 is provided at terminal 144 by the pulse shaping circuit 120 and inverting NOR device 122 from the waveform 106 provided by the NOR device 90.

The pulse signals shown by the waveforms 110, 118, 124 and 130 are provided when the machine member is moved in a forward direction to increase its dimension along the movement axis for example. In the event that the machine member 68 shown in FIG. 2 is moved in the opposite or reverse direction to decrease its dimension along the movement axis, the pulse signals shown by the waveforms 140, 142, 146 and 150 are provided.

In FIG. 4, there is shown the pulse signal 1 in accordance with the waveform 140 provided at the terminal 148 when the machine member is moving in a reverse direction to decrease its dimension along the movement axis. For this reverse operation of the motor 66 shown in FIG. 2, the pulse signal 2 shown in the waveform 142 would be provided at the terminal 152, the pulse signal 3 shown in the waveform 146 would be provided at the terminal 116 and the pulse signal 4 shown in the waveform 150 would be provided at the terminal 144.

In the operation of the signal sequence sensing apparatus 60 as shown in FIG. 2, and in accordance with the schematic showing of FIG. 1, assume for the moment that the machine member 68 is moving in a forward direction to increase its dimension along the movement axis. With reference to the NOR memory circuit 10, the pulse signal 2 in accordance with the waveform 118 is first applied to the NOR device 14 to cause it to have a ZERO output and to cause the NOR device 12 to have a ONE output. Subsequently the pulse signal 4 in accordance with the waveform 130 is applied to the NOR device 12 to cause it to have a ZERO output and the NOR device 14 to have a ONE output. Next, the pulse signal 1 in accordance with the waveform 110 is supplied to the NOR device 20 to cause it to have a ZERO output and in effect to open the two NOR gate devices 16 and 18 such that, since the NOR device 12 now has a ZERO output signal, both inputs of the NOR device 16 is now provided with a ZERO output signal such that it supplies a ONE value output signal to the AND NOR device 50 and the NOR device 52 to supply one count signal to the UP input of the reversible counter 70.

If the machine member 68 continues to move in the forward direction, the NOR memory circuit 22 has already been energized by the pulse signals 1 and 3 such that the NOR device 170 is providing a ZERO output signal and the NOR device 172 is providing a ONE output signal when the pulse signal 2 in accordance with the waveform 118 is supplied to the NOR gate device 40 to open the NOR gate devices 28 and 30 such that the NOR gate device 28 now has both of its inputs supplied with ZERO signals and thus not energized such that it provides an output ONE pulse to the AND device 50 and the NOR device 52 for energizing the UP input of the reversible counter 70 with a count pulse. Similarly, the NOR memory circuit 24 is operating with its NOR device 174 providing a ZERO output signal and the NOR device 176 having a ONE output signal when the pulse signal 3 in accordance with the waveform 124 is supplied to the NOR gate device 42 to open the NOR gate devices 32 and 34. The NOR gate device 32 since it now has each of its inputs energized by ZERO signals will provide a ONE output signal to the AND device 50 and the NOR device 52 to energize the UP input of the reversible counter 70 with a count pulse. With reference to the NOR memory circuit 26, the pulse signal 3 which occurs just prior to the pulse signal 4 shown in FIG. 4 causes the NOR device 180 to provide a ZERO output signal and the NOR device 182 to provide a ONE output signal when the pulse signal 4 in accordance with the waveform 130 causes the NOR gate device 44 to have a ZERO output signal such that the NOR gate device 36 now has both of its inputs energized by ZERO signals and it therefore provides a ONE output signal to the AND NOR device 50 and the NOR device 52 to energize the UP input of the reversible counter 70 with a single count pulse.

The operation of the signal sensing apparatus as shown in FIG. 1, when the machine member 68 is moving in a reverse direction to decrease the dimension along its movement axis, is such that the NOR memory circuit 10 has its NOR device 14 providing a ZERO output signal and the NOR device 12 providing a ONE output signal when the pulse signal 1 in accordance with the waveform 140 causes the NOR gate device 20 to provide a ZERO output signal to open the NOR gate device 16 and 18. The NOR gate device 18 now has both of its inputs energized by ZERO signals such that it provides an output ONE signal to the NOR device 54 and the NOR device 56 to energize the DOWN input of the reversible counter 70 with a single count pulse. This is true in that the pulse signal 4 in accordance with the waveform 150 is first supplied to the NOR device 12 to cause it to have a ZERO output signal and the NOR device 14 to have the ONE output signal; subsequently the pulse signal 2 in accordance with the waveform 142 is supplied to the NOR device 14 to cause it to have a ZERO output signal and to switch the NOR device 12 to now have a ONE output signal. Next, the pulse signal 1 in accordance with the waveform 140 is supplied to the NOR gate device 20 and this results in the NOR gate device 18 supplying the ONE control pulse to the DOWN input of the reversible counter 70.

The operation of the NOR memory circuit 22 is in general similar to the operation previously described for the NOR memory circuit 10. More specifically, the pulse signal 1 in accordance with the waveform 140 is supplied to the NOR device 170 to cause a ZERO output to occur and the NOR device 172 to have a ONE output. Subsequently, the pulse signal 3 in accordance with the waveform 146 is supplied to the NOR device 172 to now cause it to have a ZERO output and the NOR device 170 to have a ONE output. Next, the pulse signal 2 in accordance with the waveform 142 is supplied to the NOR gate device 40 to open the NOR gate devices 28 and 30, such that the NOR gate device 30 now has each of its inputs energized by ZERO signals such that it provides a ONE output signal to the NOR device 54 and hence to the DOWN input of the reversible counter 70. The NOR memory circuit 24 is supplied a pulse signal 2 in accordance with the waveform 142 to the NOR device 174 to cause the latter NOR device 174 to provide a ZERO output signal and the NOR device 176 to provide a ONE output signal. Subsequently, the pulse signal 4 in accordance with the waveform 150 is supplied to the NOR device 176 to cause it to have a ZERO output signal and to cause the NOR device 174 to provide a ONE output signal. Subsequently, the pulse signal 3 in accordance with the waveform 146 supplied to NOR gate device 42 opens the NOR gate devices 32 and 34, such that the NOR gate device 34 now has each of its inputs energized by ZERO signals and it supplies a ONE signal to the NOR device 54 and the DOWN input of the reversible counter 70. The memory circuit 26 similarly receives the pulse signal 3 in accordance with the waveform 146 and then the pulse signal 1 in accordance with the waveform 140 to cause the NOR device 182 to provide the ZERO output signal; then the pulse signal 4 in accordance with the waveform 150 opens the NOR gate devices 36 and 38 such that the NOR gate device 38 provides a ONE signal to the NOR device 54 and to the DOWN input of the reversible counter 70.

It should be noted that the well known NOR devices are operative such that they do not provide a ONE output signal when any one of their inputs are energized by ONE signals and such that they do provide a ONE output signal when their inputs are energized by ZERO signals. This is the normal operating condition for the NOR devices 50 and 54. However, when one of the gate NOR devices supplies a ONE output signal this causes the NOR device to provide a ZERO output signal and the subsequent inverting NOR device operative with that NOR device thereby does provide a ONE output signal.

The pulse shaper or providing circuits 112, 120, 126 and 132 as shown in FIG. 3 are more fully described in an abandoned application of Mr. M. A. Davis, Serial No. 88,404, filed February 10, 1961, entitled "Pulse Providing Apparatus" and assigned to the same assignee as is the present application.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

We claim as our invention:

1. In signal sequence sensing apparatus operative with a plurality of input signals, the combination of a plurality of signal sequence memory means, with a different one of said memory means being provided for each of said input signals and being operative for providing a first pulse signal after the occurrence of a predetermined pair of said input signals, a plurality of first signal providing means, with a different one of said first signal providing means being responsive to each of said input signals for providing a second pulse signal when its respective input signal is sensed, a plurality of second signal providing means, with each of said second signal providing means being operative with a different one of said memory means and being responsive to one each of said first and second pulse signals for providing an output signal in accordance with the presence of the latter said first and second pulse signals, and signal logic means responsive to said output signals for sensing the sequence of said input signals.

2. In signal sequence sensing apparatus operative with a plurality of input signals, the combination of a plurality of signal sequence memory means, with each of said memory means being responsive to a different pair of said input signals for providing a first pulse signal after the predetermined sequence occurrence of said pair of input signals, first signal providing means associated with one of said memory means and responsive to a predetermined one of said input signals for providing a second pulse signal when said predetermined one of said input signals is sensed, and second signal providing means associated with said one memory means and responsive to said first and second pulse signals for providing an output signal in accordance with the presence of said first and second pulse signals to indicate the sequence of said input signals.

3. In signal sequence sensing apparatus operative with a plurality of input signals, the combination of a plurality of signal sequence memory means, with each said memory means being operative with a different pair of said input signals for providing a first pulse signal after the occurrence of the latter said pair of input signals, a plurality of first signal providing means, with each said first signal providing means being associated with a different one of said memory means and responsive to the next occurring input signal relative to the operation of its associated memory means for providing a second pulse signal, a plurality of second signal providing means, with each said second signal providing means being associated with a different one of said memory means and responsive to said first pulse signal and said second pulse signal relative to its associated memory means for providing an output signal in accordance with the presence of said first and second pulse signals, and signal logic means responsive to the occurrence of each of said output signals for sensing the sequence of said input signals.

4. In signal sequence sensing apparatus operative with a plurality of input signals, the combination of a plurality of signal sequence sensing memory menas each being operative with a different pair of said input signals for providing a first pulse signal after the occurrence of the latter said pair of input signals, a plurality of first signal gating means each being associated with a different one of said memory means and responsive to a different one of said input signals for providing a second pulse signal, a plurality of second signal gating means each being associated with a different one of said memory means and responsive to said first pulse signal and said second pulse signal relative to its associated memory means for providing an output signal, and output signal logic means responsive to the simultaneous occurrence of said output signals for sensing the sequence of said input signals.

5. In signal sequence sensing apparatus operative with a plurality of input signals, the combination of a plurality of signal sequence memory means each responsive to a different pair of said input signals for providing a first pulse signal after the occurrence of the latter said pair of input signals in a particular sequence, a plurality of first signal providing means each being associated with a different one of said memory means and responsive to the next occurring input signal relative to the operation of its associated memory means for providing a second pulse signal, a plurality of second signal providing means each being associated with a different one of said memory means and responsive to said first pulse signal and said second pulse signal relative to its associated memory means for providing an output signal in accordance with the presence of said first and second pulse signals, and signal logic means responsive to the occurrence of said output signals for sensing the sequence of said input signals.

References Cited by the Examiner

UNITED STATES PATENTS

| | | | |
|---|---|---|---|
| 2,705,795 | 4/55 | Fisk et al. | 328—104 X |
| 2,953,773 | 9/60 | Nicolantonio | 340—147 X |
| 2,964,653 | 12/60 | Cagle et al. | 307—88.5 |

ARTHUR GAUSS, *Primary Examiner.*

NEIL C. READ, *Examiner.*